(12) United States Patent
Schill et al.

(10) Patent No.: US 11,292,405 B2
(45) Date of Patent: Apr. 5, 2022

(54) BATTERY TERMINAL WITH A STAR-POINT CONNECTION SWITCH CONFIGURATION FOR A VEHICLE ELECTRICAL SYSTEM

(71) Applicant: Robert Bosch GmbH, Stuttgart (DE)

(72) Inventors: Georg Schill, Pforzheim (DE); Andre Owerfeldt, Markgroeningen (DE); Basti Anil Shenoy, Bietigheim-Bissingen (DE); Britta Kronenberg, Tamm (DE); Gita Woite, Gerlingen (DE); Juergen Motz, Steinheim an der Murr (DE); Marco Beckmann, Korntal-Muenchingen (DE); Matthias Zabka, Suessen (DE); Nils Draese, Stuttgart (DE); Slava Tihovsky, Stuttgart (DE); Timo Lothspeich, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/963,276

(22) PCT Filed: Jan. 16, 2019

(86) PCT No.: PCT/EP2019/051008
§ 371 (c)(1),
(2) Date: Jul. 20, 2020

(87) PCT Pub. No.: WO2019/166148
PCT Pub. Date: Sep. 6, 2019

(65) Prior Publication Data
US 2020/0339051 A1 Oct. 29, 2020

(30) Foreign Application Priority Data
Feb. 28, 2018 (DE) ...................... 10 2018 202 987.3

(51) Int. Cl.
*B60R 16/033* (2006.01)
*B60L 58/10* (2019.01)
(Continued)

(52) U.S. Cl.
CPC ............ *B60R 16/033* (2013.01); *B60L 58/10* (2019.02); *H01M 10/425* (2013.01);
(Continued)

(58) Field of Classification Search
CPC .... B60R 16/033; B60L 58/10; H01M 10/425; H01M 2010/4271; H01M 2220/20; H02J 7/0031; H02J 7/0047
(Continued)

(56) References Cited

U.S. PATENT DOCUMENTS

| | | | |
|---|---|---|---|
| 5,488,283 A | 1/1996 | Dougherty et al. | |
| 5,751,073 A | 5/1998 | Ross | |
| 6,229,279 B1 * | 5/2001 | Dierker | F02N 11/0866 320/104 |

FOREIGN PATENT DOCUMENTS

| | | | |
|---|---|---|---|
| CN | 106255623 | * | 12/2016 |
| DE | 102012024738 | * | 6/2014 |

(Continued)

OTHER PUBLICATIONS

Translation of CN 106255623, 8 pages (Year: 2016).*
International Search Report for PCT/EP2019/051008, dated May 13, 2019.

*Primary Examiner* — Nathaniel R Pelton
(74) *Attorney, Agent, or Firm* — Norton Rose Fulbright US LLP; Gerard Messina (57) ABSTRACT

A battery terminal which implements an electronically controlled vehicle electrical system coupling-disconnecting functionality including an electronically controlled power distribution, the battery terminal including a number of
(Continued)

switching elements, of which at least some are connected to one another in a star point shape, the star-point connection being provided to be connected to a positive pole of a voltage source.

10 Claims, 5 Drawing Sheets

(51) Int. Cl.
*H01M 10/42* (2006.01)
*H02J 7/00* (2006.01)
*H01M 50/543* (2021.01)

(52) U.S. Cl.
CPC ......... *H01M 50/543* (2021.01); *H02J 7/0031* (2013.01); *H01M 2010/4271* (2013.01); *H01M 2220/20* (2013.01); *H02J 7/0047* (2013.01)

(58) Field of Classification Search
USPC .......................................................... 320/109
See application file for complete search history.

(56) References Cited

FOREIGN PATENT DOCUMENTS

| | | | |
|---|---|---|---|
| DE | 102012024738 | A1 | 6/2014 |
| EP | 0987146 | A2 | 3/2000 |
| EP | 2272722 | A2 | 1/2011 |
| JP | 2017077158 | A | 4/2017 |
| WO | 2017208751 | A1 | 12/2017 |

\* cited by examiner

BATTERY TERMINAL WITH A STAR-POINT CONNECTION SWITCH CONFIGURATION FOR A VEHICLE ELECTRICAL SYSTEM

FIELD

The present invention relates to a battery terminal, which is in particular intelligent, for vehicle electrical systems, in particular for error-tolerant vehicle electrical systems, a vehicle electrical system including such a battery terminal, and a method for operating such a vehicle electrical system.

BACKGROUND INFORMATION

A vehicle electrical system is to be understood, in particular in automotive use, as the entirety of all electrical components in a motor vehicle. Therefore, both electrical consumers and supply sources, for example, generators or electrical accumulators, for example, batteries, are encompassed. Care has to be taken in the motor vehicle that electrical energy is available in such a way that the motor vehicle may be started at any time and a sufficient power supply is ensured during operation. However, electrical consumers are still to be operable for a reasonable period of time in the turned-off state, without a subsequent start being negatively affected.

It is to be noted that due to the increasing electrification of assemblies and the introduction of new driving functions, the requirements for the reliability and error tolerance of the electrical energy supply in the motor vehicle are increasing continuously. Furthermore, it is to be considered that in future activities external to driving are to be permissible to a limited extent in the case of highly-automated driving. A sensory, control, mechanical, and energetic fallback level by the driver is only still present to a limited extent in this case. Therefore, in the case of highly-automated or fully-automated or autonomous driving, the electrical supply has a safety relevance previously unknown in motor vehicles. Errors in the vehicle electrical system therefore have to be reliably and preferably completely detected and isolated.

Automated or also highly-automated driving is to be understood as an intermediate step between assisted driving, in which the driver is assisted by assistance systems, and autonomous driving, in which the vehicle drives independently and without action of the driver. In highly-automated driving, the vehicle has a separate intelligence, which plans ahead and could take over the driving task at least in most driving situations. The electrical supply therefore has a high level of safety relevance in the case of highly-automated driving. Energy supply and consumer may therefore be designed redundantly. One example of this is the energy supply of redundant brake actuators in which the electronic stability program (ESP) is supplied by the first (partial) vehicle electrical system and the electromechanical brake booster (EBB) is supplied by the second (partial) vehicle electrical systems. A supply from two redundant energy sources could therefore be useful.

Therefore, coupling elements for coupling safety-relevant (partial) vehicle electrical systems are required, which are capable of independently recognizing defective electrical consumers or consumer groups or partial networks and disconnecting them without feedback and reliably from the remaining (partial) vehicle electrical system to fulfill requirements for the error tolerance in the supply of safety-relevant consumers, which exist in the case of automated driving in private vehicles, commercial vehicles, or trucks.

SUMMARY

In accordance with example embodiments of the present invention, an intelligent battery terminal (IBAT) and an error-tolerant vehicle electrical system including at least two such intelligent battery terminals are provided. Furthermore, an example method for operating such a vehicle electrical system is provided in accordance with the present invention. Specific embodiments result from the description herein.

In particular, a procedure or a method for increasing the error tolerance of the electrical energy supply in a multi-channel vehicle electrical system of a motor vehicle with the aid of switch-based coupling and/or disconnecting elements is provided in accordance with an example embodiment of the present invention.

In accordance with an example embodiment of the present invention, an intelligent battery terminal (IBAT) is provided, which combines the function of a coupling and/or disconnecting element and a multichannel electronic fuse and may additionally be equipped with further functions such as battery state detection or battery management. This intelligent battery terminal may be used in a vehicle electrical system and is also referred to herein as a coupling/disconnecting element, electronic fuse, or as an electronic power distributor.

Two intelligent battery terminals represent the result of the substitution of one concentrated coupling/disconnecting element provided for coupling two safety-relevant (partial) vehicle electrical systems having increased requirements for the reliability of the disconnecting function, in conjunction with the successive elimination of its disadvantageous interaction properties.

A high level of reliability of the disconnecting function is required everywhere a coupling/disconnecting element couples two or multiple safety-relevant (partial) vehicle electrical systems and where, in the coupled state, errors in one of the (partial) vehicle electrical systems could result in a simultaneous adverse effect in the other of these safety-relevant (partial) vehicle electrical systems coupled to this network.

The intelligent battery terminal is to be understood as a particularly advantageous design of a coupling/disconnecting element or a specific arrangement of switching elements, in particular of power-electronic components, including associated terminals, sensors, evaluation circuits, and activation circuits, which is capable of automatically detecting errors in the connected consumers and lines and isolating them without feedback and reliably from the remaining (partial) vehicle electrical system, and which may advantageously be functionally expanded, due to an optimum placement at the positive pole of the voltage source, attached thereto directly or via a short line, with optional additional functions, for example, battery state detection (BSD), battery management system (BMS), data logging, etc.

Due to the very short reaction time and the precisely configurable threshold values for trigger units, the functionality of the electronic fuse minimizes the electrical and thermal stress of protected cables, whereby a better utilization of the cross-sectional area is enabled and therefore the total cable weight, the energy consumption, and the air pollution are reduced.

The provided intelligent battery terminal implements a functional unification of the electronically controlled vehicle electrical system coupling-disconnecting functionality required in particular for autonomous driving with the electronically controlled power distribution. The implementation may be carried out with the aid of semiconductor switches or relays.

Furthermore, the type of the implementation of this functional unification by distributed coupling/disconnecting elements and their electrical positioning at the positive pole of the voltage source, connected thereto directly or via a short line, is provided herein.

Therefore, instead of a concentrated design of the switching coupling/disconnecting element, a distributed implementation having two units, which each include one half of the otherwise required redundant switch arrangement, is provided. This implementation may be connected either directly to the positive terminal of a voltage source, for example, to the battery positive pole, or may be connected via a short line to this pole and may be equipped with additional switching elements for safeguarding the consumers or partial networks or consumer groups to be supplied by the voltage source.

It is to be noted that the battery connecting line represents a line section which is subjected to resistance and inductance and through which the (battery) sum current flows, which is connected in series to the internal impedance of the battery and negatively influences the electrical properties of the battery as a voltage source. For this reason, the length of the battery connecting line is to be minimized.

A further aspect which makes necessary a restriction of the line length between the battery and the overcurrent device to be installed for the purpose of thermal safeguard of the connected line is the probability of occurrence of errors on the line, which rises with increasing line length, for example, for a ground short-circuit of a positive line.

DIN EN ISO 10133 requires, among other things, that a fuse has to be installed in every circuit or line of the system within a distance of 200 mm from the current source, measured via the line.

It is to be noted that due to the allocation of the concentrated switch functionalities, the redundant switching units forming the coupling/disconnecting element having increased requirements for the reliability of the disconnecting function (series connection of multiple bidirectionally disconnecting switches) may be designed identically, and, in comparison to the concentrated design, may additionally be designed as smaller and having a reduced cooling expenditure since the power loss is distributed to two physical units. Both development costs and manufacturing costs may be reduced in this way.

In one design, a star-point electrical connection of the switching elements is provided at the positive terminal of the voltage source. This has the advantage that the inductive voltage overshoots and undershoots resulting upon the disconnection of the load may be locked with respect to voltage by the voltage source and thus have no effect on the quality of the voltage supply of the connected consumers or (partial) vehicle electrical systems.

If additional integrated switching elements are provided for safeguarding the consumers or partial networks or consumer groups to be supplied by the voltage source, this has the advantage that fault currents possibly caused by consumers themselves or in their supply lines, for example, due to overload or short-circuit to vehicle body or ground, may be detected by the same coupling/disconnecting element or the same intelligent battery terminal and disconnected or isolated from the remaining (partial) vehicle electrical system, which is not possible upon use of a concentrated coupling/disconnecting element even in the case of a star-point wiring of the consumers implemented at the positive terminal of the voltage source.

A further advantage is that possibly occurring fault currents which arise in the line segment between the (partial) vehicle electrical systems to be coupled, for example, due to overload or short-circuit to vehicle body or ground may be detected and disconnected by the intelligent battery terminals. This may take place redundantly, which is also not possible upon use of a concentrated coupling/disconnecting element. A concentrated coupling/disconnecting element may detect the voltage collapse and disconnect the previously coupled vehicle electrical systems; however, it cannot disconnect the fault current which loads one of the (partial) vehicle electrical systems even after its disconnection.

Due to an optimal positioning of the provided intelligent battery terminal or coupling element, which is also used as a type of electronic fuse box or power distributor, on or at the positive pole of the automobile battery, it is not only possible to further reduce the expenditure for the line coupling, but rather additional useful functions, for example, a battery state detection or a battery cell management, may also be integrated into the provided intelligent battery terminal. The integration option into the battery housing is also to be mentioned at this point. The integration option of the intelligent battery terminal is useful in particular in the case of lithium-ion batteries.

With the aid of multiple IBATs, an expandable error-tolerant power network or vehicle electrical system including multiple accurately monitored power network or vehicle electrical system channels, including the automatic feedback-free disconnecting function of defective consumers in every channel and the automatic feedback-free disconnecting function of coupled vehicle electrical system channels, may be easily implemented.

The provided intelligent battery terminal in accordance with an example embodiment of the present invention enables in particular consumers or partial networks to be switched off without feedback, i.e., without adversely affecting the voltage supply in the remaining (partial) vehicle electrical system to be protected, in the event of overvoltage or undervoltage or overcurrent. Operating voltage limits of the consumers in the (partial) vehicle electrical system to be protected and the operating current limits of the lines in the defective partial networks are thus not violated.

Further advantages and designs of the present invention result from the description and the figures.

It is evident that the above-mentioned features and the features to be explained hereinafter are usable not only in the particular specified combination, but rather also in other combinations or alone, without departing from the scope of the present invention.

BRIEF DESCRIPTION OF THE DRAWINGS

FIG. 4 shows two (partial) vehicle electrical systems from FIG. 3, which are coupled using two provided intelligent battery terminals. The increased requirement for the reliability of the disconnecting function was taken into consideration by the series connection of two distributed bidirectional disconnecting switches (distributed coupling element). Due to the spatial allocation of the coupling/disconnecting elements, the error tolerance with respect to ground short-circuits in the middle line section connecting the two (partial) vehicle electrical systems was additionally achieved. The star-point connection of the individual consumers or consumer groups to the voltage source (battery) of the particular (partial) vehicle electrical system was implemented to be switchable, whereby these may be individually monitored and isolated or disconnected in case of error. The star-point connection additionally also minimizes the effect of the inductive voltage overshoots and undershoots caused by the function of the switching elements in the (partial) vehicle electrical systems to be coupled or to be disconnected.

DETAILED DESCRIPTION OF EXAMPLE EMBODIMENTS

The present invention is schematically illustrated with the aid of specific embodiments shown in the figures and is described in greater detail hereinafter with reference to the figures.

Figure 1:
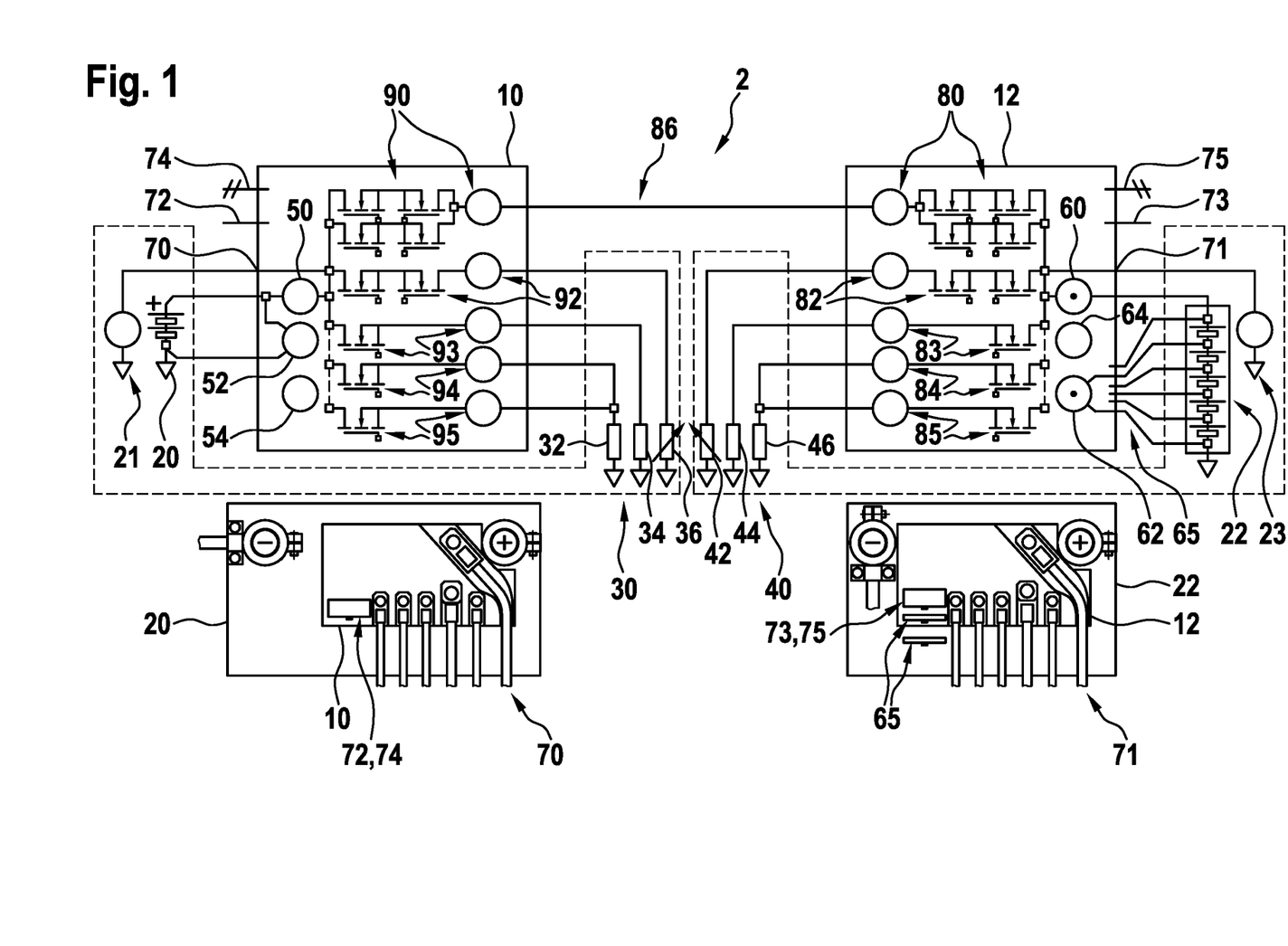
FIG. 1 shows an example embodiment of an error-tolerant vehicle electrical system including a provided distributed coupling/disconnecting element including increased requirements for the reliability of the disconnecting function using two provided intelligent battery terminals.

FIG. 1 shows an error-tolerant vehicle electrical system 2 made up of two coupled error-tolerant (partial) vehicle electrical systems 30, 40, the error tolerance of both (partial) vehicle electrical systems 30, 40 and of entire vehicle electrical system 2 being achieved by the use of provided intelligent battery terminals, namely by a first battery terminal 10 and a second battery terminal 12. The two battery terminals 10, 12 may also be referred to as intelligent battery terminals. First battery terminal 10 is provided for a first battery 20, for example, a lead acid battery here, and second battery terminal 12 is provided for a second battery 22, for example, a lithium-ion battery here including single cell contacts or BMS interface 65. Furthermore, first battery 20 is associated with first partial vehicle electrical system 30 including consumers 32, 34, 36 and second battery 22 is associated with second partial vehicle electrical system 40 including consumers 42, 44, 46. The two partial vehicle electrical systems 30, 40 may be coupled to one another and disconnected from one another.

An amp meter 50, a voltmeter 52, and a temperature sensor 54 are provided for monitoring first battery 20. Accordingly, an amp meter 60, a voltmeter 62 (including option of voltage detection of individual battery cells via BMS interface 65), and a temperature sensor 64 are provided for monitoring second battery 22. A series of switching elements or switches is provided in battery terminals 10, 12, which are designed, for example, as MOSFETs. The structure will be explained in greater detail hereinafter.

Furthermore, a starter 21 including flexible connection points 70, 71 and an auxiliary or main energy source 23, for example, an electric machine, a generator, or a DC/DC converter or the like, including flexible feed points 70, 71 or in an arbitrary section of line 86 connecting (partial) vehicle electrical systems 30, 40 may be provided. Furthermore, communication interfaces, for example, CAN (74, 75), LIN (72, 73), etc., are provided for communication with higher-order control units.

Furthermore, control interfaces or signal lines and a BMS interface 65 may be provided.

Provided battery terminals 10, 12 may fulfill multiple functions in error-tolerant vehicle electrical system 2. They may thus be used both for power distribution and for coupling (partial) vehicle electrical systems 30, 40. (Partial) vehicle electrical systems 30, 40 shown and line 86 connecting these (partial) vehicle electrical systems may be monitored in this way. Furthermore, a battery state detection (BSD) may be provided in conjunction with a battery management system (BMS) and/or a battery cell management 65. In particular, if the operating voltage limits are violated, (partial) vehicle electrical systems may be disconnected from one another or partial networks or consumer groups may be disconnected from the voltage source. For this purpose, an array of switching elements including associated voltage, current, and temperature measuring points 90, 92, 93, 94, and 95 are provided in first intelligent battery terminal 10 and an array of switching elements including associated voltage, current, and temperature measuring points 80, 82, 83, 84, and 85 are also provided in second intelligent battery terminal 12. Switching elements may be connected in parallel to increase the current carrying capacity or may be connected in series to achieve the bidirectional disconnectability, for example, upon the implementation using semiconductor switches.

The flexible usage options of provided intelligent battery terminal 10, 12 in different vehicle electrical system designs are significant, for example, the connection of the auxiliary or main energy source, for example, an electric machine, a generator, or a central DC/DC converter or the connection of a starter, in the error-tolerant vehicle electrical system 2 outlined in FIG. 1.

Figure 2:
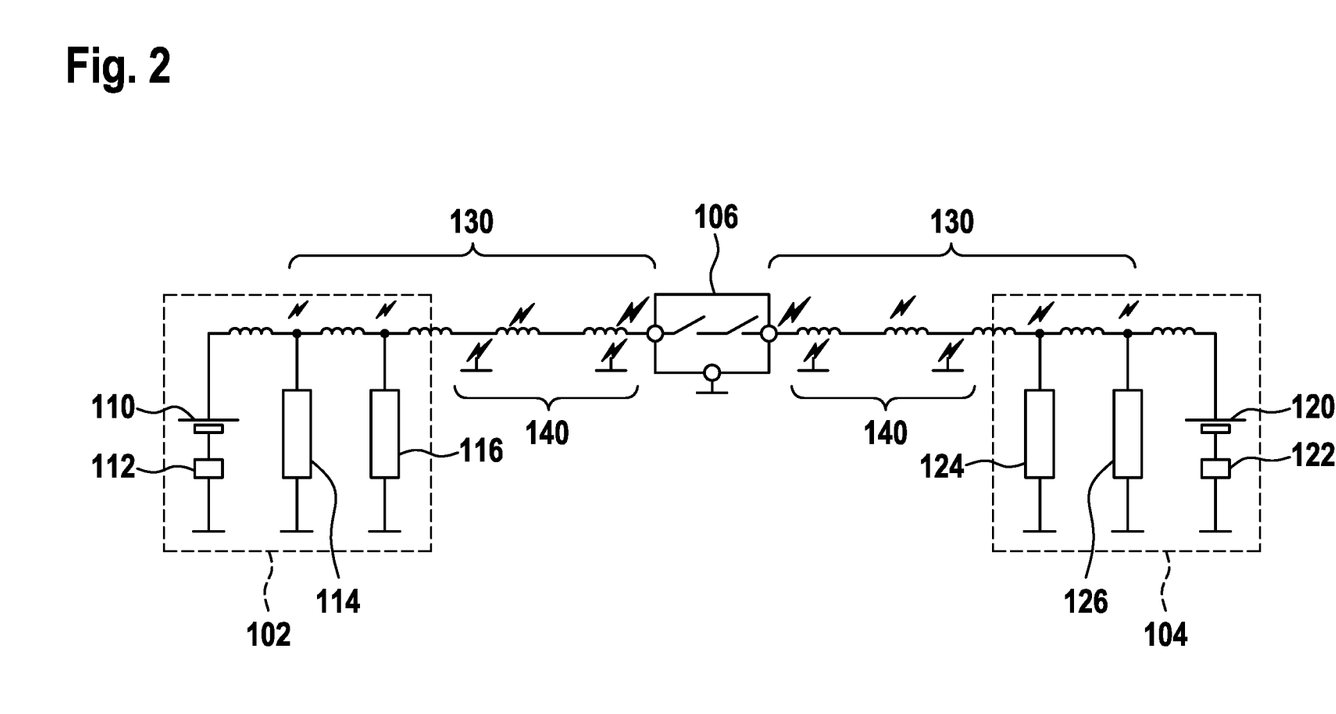
FIG. 2 shows two (partial) vehicle electrical systems according to the related art, which are coupled with the aid of a concentrated coupling/disconnecting element including increased requirements for the reliability of the disconnecting function (series connection of two bidirectional disconnecting switches).

FIG. 2 illustrates the starting situation during the development and shows a first (partial) vehicle electrical system 102 and a second (partial) vehicle electrical system 104, which are to be coupled via line segments 140 with the aid of a concentrated coupling/disconnecting element 106 according to the related art.

A first battery 110, a first battery state monitor 112, a first first consumer $R_{1,1}$ 114 and a first nth consumer $R_{1,n}$ 116 are provided in first (partial) vehicle electrical system 102. A second battery 120, a second battery state monitor 122, a second first consumer $R_{2,1}$ 124 and a second nth consumer $R_{2,n}$ 126 are provided in second (partial) vehicle electrical system 104. Furthermore, distance-dependent switching overvoltage intensities 130 due to parasitic inductances and potentially long unprotected line segments 140 are illustrated in the representation.

Figure 3:
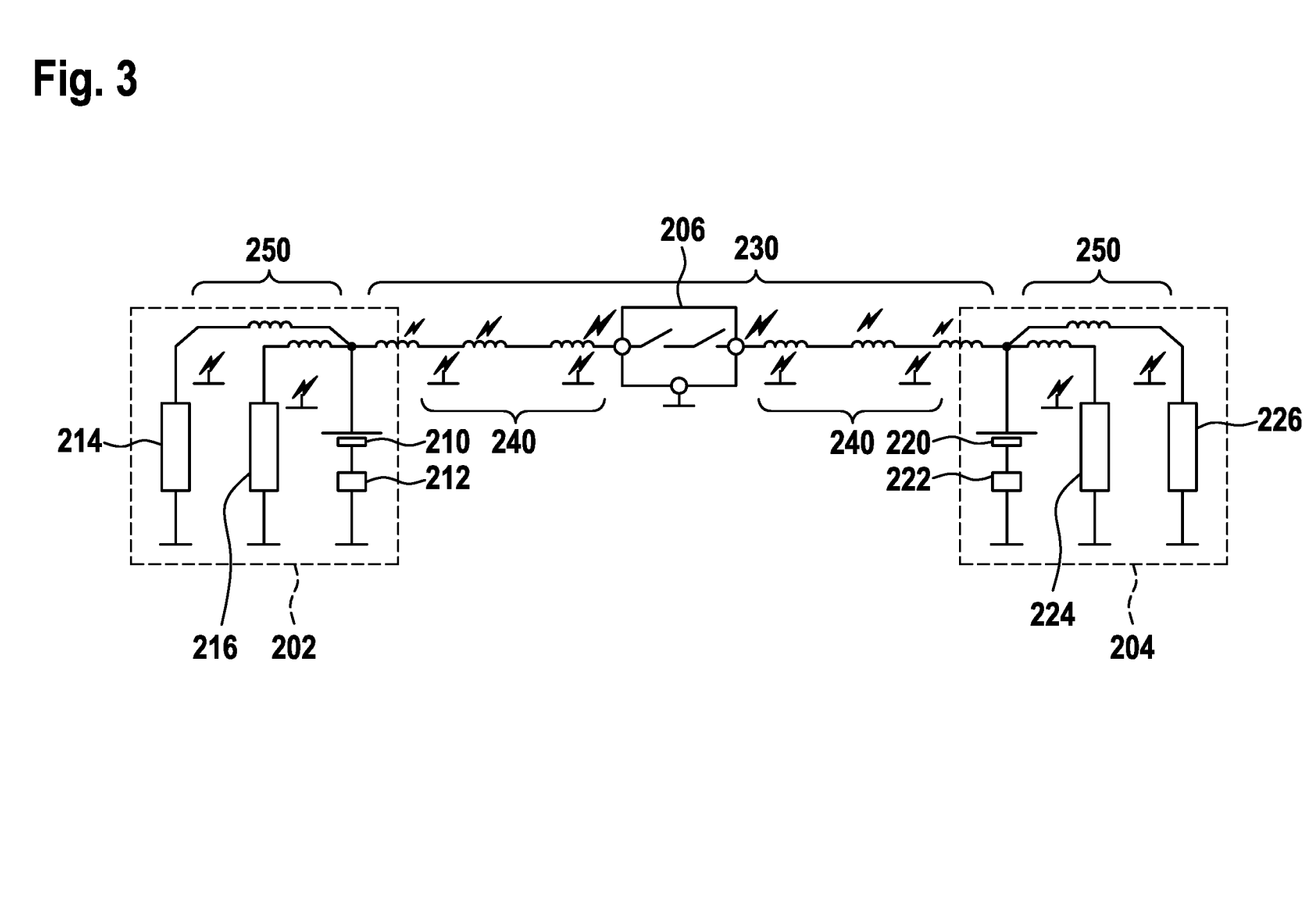
FIG. 3 shows two (partial) vehicle electrical systems from FIG. 2 coupled with the aid of a concentrated coupling/ disconnecting element, the effect of the inductive voltage overshoots and voltage undershoots caused by the switching function of the coupling/disconnecting element on the consumers of the coupled (partial) vehicle electrical systems having been minimized by their star-point connection to the particular voltage source, for example, a battery.

FIG. 3 shows a first partial vehicle electrical system 202 and a second partial electrical system 204, which are to be coupled to one another via line segments 240 with the aid of a concentrated coupling/disconnecting element 206.

A first battery 210, a first battery state monitor 212, a first first consumer $R_{1,1}$ 214, and a first nth consumer $R_{1,n}$ 216 are provided in first partial vehicle electrical system 202. A second battery 220, a second battery state monitor 222, a second first consumer $R_{2,1}$ 224 and a second nth consumer $R_{2,n}$ 226 are provided in second partial vehicle electrical system 204. Furthermore, inductive voltage overshoots and voltage undershoots 230 caused by the switching function of coupling element 206, which are locked between energy accumulators having low impedance, by which their effect on the consumers of the coupled (partial) vehicle electrical systems is minimized, and potentially long unprotected line segments 240 are illustrated in the illustration. Furthermore, it is to be noted that coupling element 206 is quasi-blind with respect to fault currents in areas 250.

It is clear that coupling elements 106, 206 shown in FIGS. 2 and 3 are designed as concentrated units.

Figure 4:
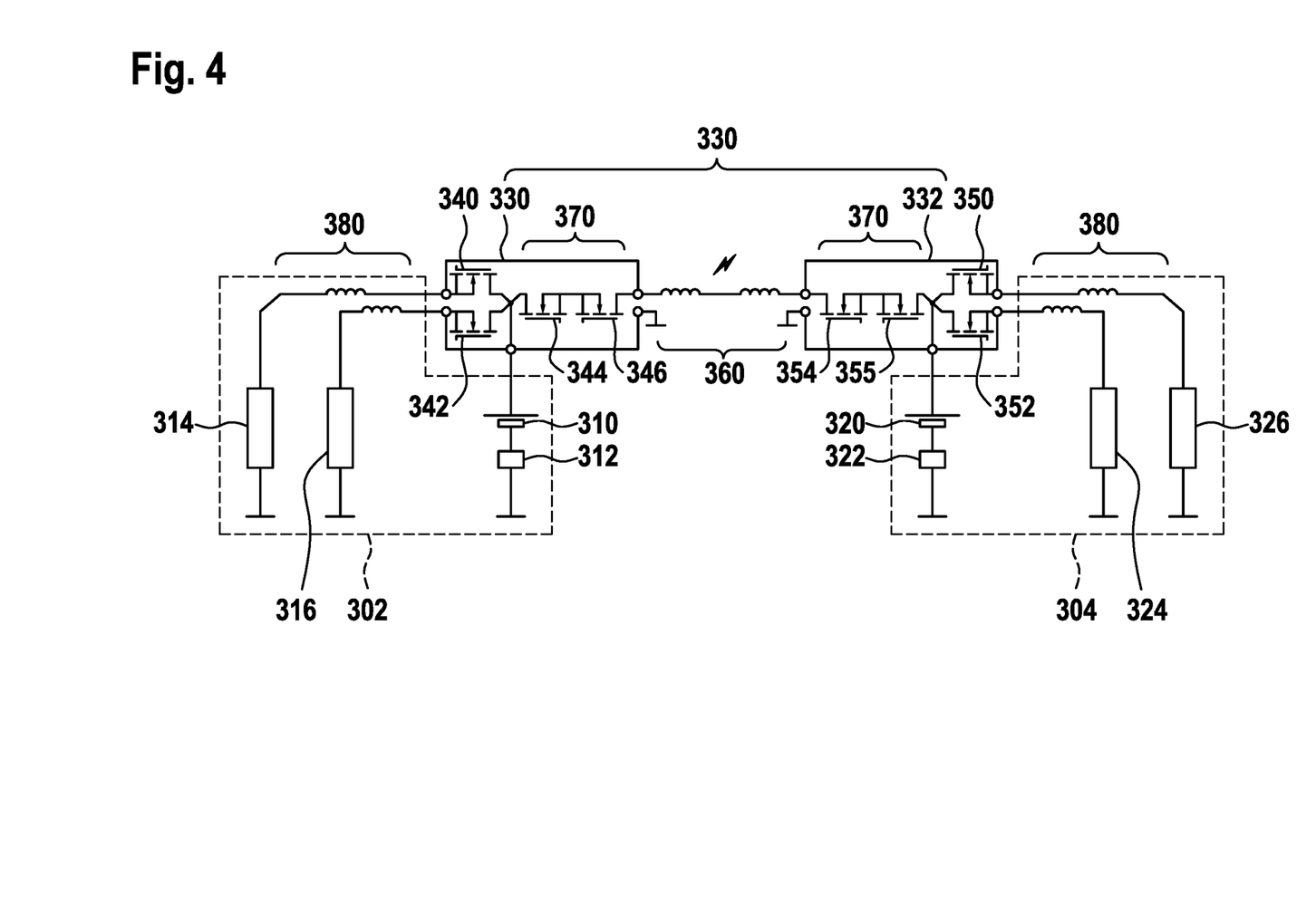

FIG. 4 shows two partial vehicle electrical systems 302, 304, which are coupled via line segment 360 using two provided intelligent battery terminals 330, 332. A first battery 310, a first battery state monitor 312, a first first consumer $R_{1,1}$ 314, and a first nth consumer $R_{1,n}$ 316 are provided in first partial vehicle electrical system 302. A second battery 320, a second battery state monitor 322, a second first consumer $R_{2,1}$ 324 and a second nth consumer $R_{2,n}$ 326 are provided in second partial vehicle electrical system 304.

First intelligent battery terminal 330 is associated with first partial vehicle electrical system 302 and second intelligent battery terminal 332 is associated with second partial vehicle electrical system 304. Switches or switching elements are provided in first battery terminal 330, namely a first MOSFET 340, a second MOSFET 342, a third MOSFET 344, and a fourth MOSFET 346. First MOSFET 340 and second MOSFET 342 are situated in parallel to one another. Third MOSFET 344 and fourth MOSFET 346 are situated in series to one another, specifically in opposite direction, for example, "back-to-back" or including a shared source terminal. Furthermore, the star-point connection between first MOSFET 340, second MOSFET 342, and third MOSFET 344 as switching elements including connection to the positive pole of first battery 310 is apparent.

Switches or switching elements are provided in second battery terminal 332, namely a first MOSFET 350, a second MOSFET 352, a third MOSFET 354, and a fourth MOSFET 355. First MOSFET 350 and second MOSFET 352 are situated in parallel to one another. Third MOSFET 354 and fourth MOSFET 355 are situated in series to one another, specifically in opposite direction, for example, "back-to-back" or including a shared source terminal. Furthermore, the star-point connection between first MOSFET 350, second MOSFET 352, and fourth MOSFET 355 as switching elements including connection to the positive pole of second battery 320 is apparent.

Instead of MOSFETs, for example, relays, bipolar transistors, or IGBTs including parallel diodes, etc., may also be used.

The illustration furthermore shows protected network connections 360 and illustrates distributed switching elements 370, which form the resulting distributed coupling/disconnecting element including increased requirements for the reliability of the disconnecting function, protected network areas 380, and switching overvoltages 330, which are locked between energy accumulators having low impedance.

Figure 5:
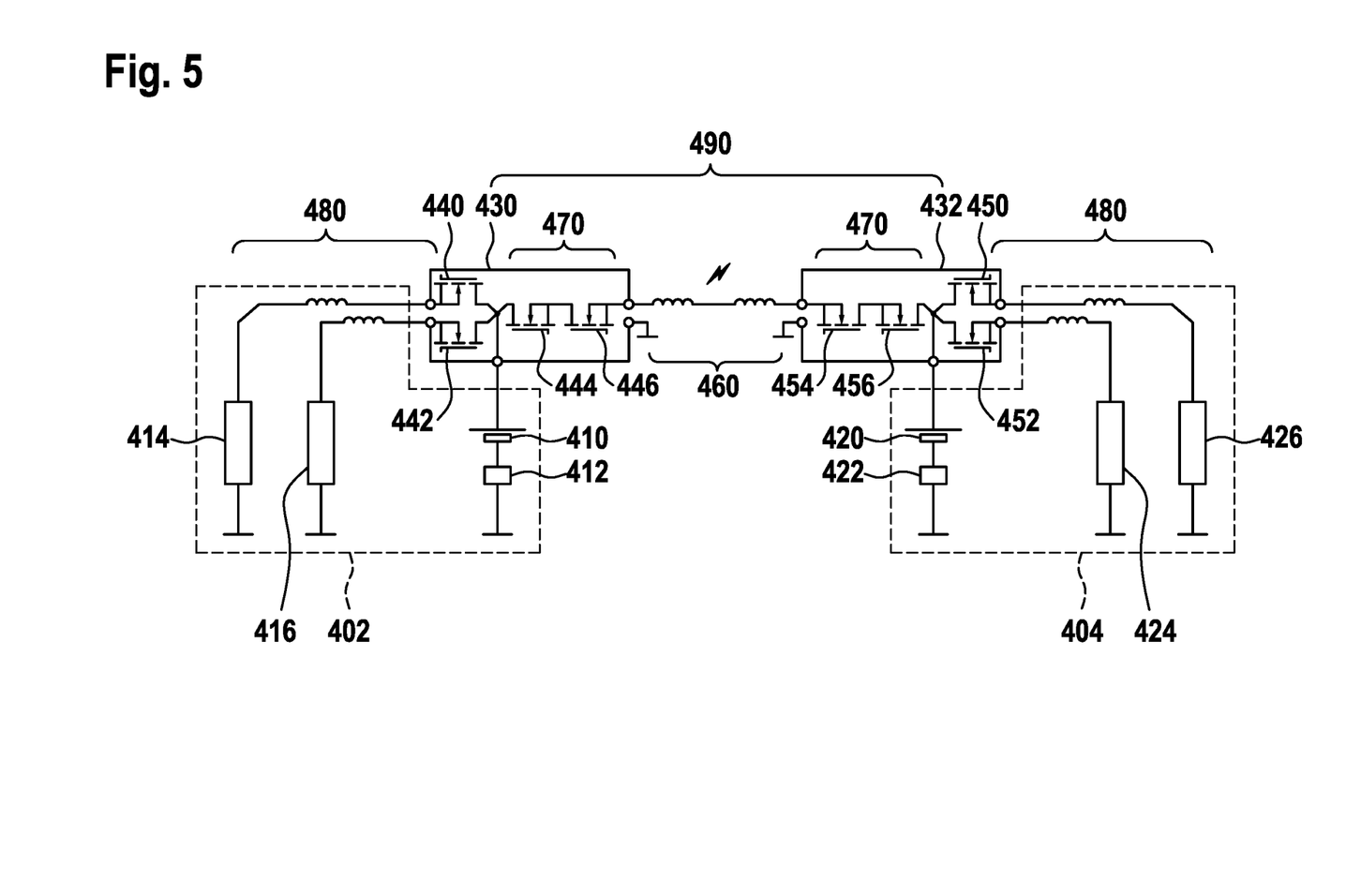
FIG. 5 shows two (partial) vehicle electrical systems from FIG. 4, which are coupled using two provided intelligent battery terminals, the error tolerance with respect to the ground short-circuits in the middle line section connecting the two (partial) vehicle electrical systems being achieved even in the case of simple errors in the distributed coupling elements.

FIG. 5 shows two partial vehicle electrical systems 402, 404, which are coupled via line segment 460 using two provided intelligent battery terminals 430, 432. A first battery 410, a first battery state monitor 412, a first first consumer $R_{1,1}$ 414, and a first nth consumer $R_{1,n}$ 416 are provided in first partial vehicle electrical system 402. A second battery 420, a second battery state monitor 422, a second first consumer $R_{2,1}$ 424, and a second nth consumer $R_{2,n}$ 426 are provided in second partial vehicle electrical system 404.

First intelligent battery terminal 430 is associated with first partial vehicle electrical system 402 and second intelligent battery terminal 432 is associated with second partial vehicle electrical system 404. Switches or switching elements are provided in first battery terminal 430, namely a first MOSFET 440, a second MOSFET 442, a third MOSFET 444, and a fourth MOSFET 446. First MOSFET 440 and second MOSFET 442 are situated in parallel to one another. Third MOSFET 444 and fourth MOSFET 446 are situated in series to one another and specifically in the same direction. Furthermore, the star-point connection between first MOSFET 440, second MOSFET 442, and third MOSFET 444 as switching elements including connection to the positive pole of first battery 410 is apparent.

Switches or switching elements are provided in second battery terminal 432, namely a first MOSFET 450, a second MOSFET 452, a third MOSFET 454, and a fourth MOSFET 456. First MOSFET 450 and second MOSFET 452 are situated in parallel to one another. Third MOSFET 454 and fourth MOSFET 456 are situated in series to one another and specifically in the same direction. Furthermore, the star-point connection between first MOSFET 450, second MOSFET 452, and fourth MOSFET 456 as switching elements including connection to the positive pole of second battery 420 is apparent.

The figure furthermore shows protected network connections 460 and illustrates distributed switching elements 470, which form the resulting distributed coupling/disconnecting element including increased requirements for the reliability of the disconnecting function, protected network areas 480, and switching overvoltages 490, which are locked between energy accumulators having low impedance.

It is to be taken into consideration that due to the unidirectional arrangement, which is particularly to be highlighted, of the switching elements (MOSFETs here) forming distributed switching elements 470, an improved error tolerance is achieved with respect to the ground short-circuits in middle line section 460 connecting the two (partial) vehicle electrical systems, which permits simple errors in switching elements 470.

What is claimed is:

1. A battery terminal of a first sub-electrical system which implements an electronically controlled vehicle electrical system coupling-disconnecting functionality including an electronically controlled power distribution, the battery terminal comprising:

a plurality of switching elements of which at least some are connected to one another in a star-point shape formed by a plurality of lines branching from a common connection point that is configured to be connected to a positive pole of a first voltage source, wherein the at least some of the plurality of switching elements include:

a first switch on a first of the plurality of lines between the common connection point and a first electrical load that can be powered by the first voltage source;

a second switch on a second of the plurality of lines between the common connection point and a second electrical load that can be powered by the first voltage source; and a third switch on a third of the plurality of lines between the common connection point and a second sub-electrical system that includes a second voltage source and one or more electrical loads that can be powered by the second voltage source.

2. The battery terminal as recited in claim 1, further comprising at least one battery state detection.

3. The battery terminal as recited in claim 1, further comprising at least one battery cell management.

4. The battery terminal as recited in claim 1, further comprising at least one battery management system.

5. A vehicle electrical system, comprising:
a first partial vehicle electrical system including a first voltage source and a first battery terminal;
a second partial vehicle electrical system including a second voltage source and a second battery terminal;
wherein:
the first battery terminal includes a first plurality of switching elements of which at least some are connected to one another in a first star-point shape formed by a plurality of lines branching from a first common connection point that is configured to be connected to a positive pole of the first voltage source, the at least some of the first plurality of switching elements including (a) a first switch on a first of the plurality of lines of the first star-point shape between the first common connection point of the first star-point shape and a first electrical load that can be powered by the first voltage source via the first switch, (b) a second switch on a second of the plurality of lines of the first star-point shape between the first common connection point of the first star-point shape and a second electrical load that can be powered by the first voltage source via the second switch, and (c) a third switch on a third of the plurality of lines of the first star-point shape;
the second battery terminal includes a second plurality of switching elements of which at least some are connected to one another in a second star-point shape formed by a plurality of lines branching from a second common connection point that is configured to be connected to a positive pole of the second voltage source, the at least some of the second plurality of switching elements including (a) a fourth switch on a first of the plurality of lines of the second star-point shape between the second common connection point of the second star-point shape and a third electrical load that can be powered by the second voltage source via the fourth switch, (b) a fifth switch on a second of the plurality of lines of the second star-point shape between the second common connection point of the first second point shape and a fourth electrical load that can be powered by the first voltage source via the fifth switch, and (c) a sixth switch on a third of the plurality of lines of the second star-point shape; and
the third switch, which is of the first star-point shape, and the fourth switch, which is of the second star-point shape, are connected to each other, the third switch being arranged between the first common connection point and the second partial vehicle electrical system, and the sixth switch being arranged between the second common connection point and the first partial vehicle electrical system.

6. A method for operating a vehicle electrical system that includes (a) a first partial vehicle electrical system including a first voltage source and a first battery terminal and (b) a second partial vehicle electrical system including a second voltage source and a second battery terminal, wherein the first battery terminal includes a first plurality of switching elements of which at least some are connected to one another in a first star-point shape formed by a plurality of lines branching from a first common connection point that is configured to be connected to a positive pole of the first voltage source, the at least some of the first plurality of switching elements including a first switch on a first of the plurality of lines of the first star-point shape between the first common connection point of the first star-point shape and a first electrical load that can be powered by the first voltage source via the first switch, a second switch on a second of the plurality of lines of the first star-point shape between the first common connection point of the first star-point shape and a second electrical load that can be powered by the first voltage source via the second switch, and a third switch on a third of the plurality of lines of the first star-point shape, wherein the second battery terminal includes a second plurality of switching elements of which at least some are connected to one another in a second star-point shape formed by a plurality of lines branching from a second common connection point that is configured to be connected to a positive pole of the second voltage source, the at least some of the second plurality of switching elements including a fourth switch on a first of the plurality of lines of the second star-point shape between the second common connection point of the second star-point shape and a third electrical load that can be powered by the second voltage source via the fourth switch, a fifth switch on a second of the plurality of lines of the second star-point shape between the second common connection point of the first second point shape and a fourth electrical load that can be powered by the first voltage source via the fifth switch, and a sixth switch on a third of the plurality of lines of the second star-point shape, and wherein the third switch, which is of the first star-point shape, and the fourth switch, which is of the second star-point shape, are connected to each other, the third switch being arranged between the first common connection point and the second partial vehicle electrical system, and the sixth switch being arranged between the second common connection point and the first partial vehicle electrical system, the method comprising:
coupling the first partial vehicle electrical system and the second partial vehicle electrical system to each another via the third switch, which is of the first battery terminal of the first partial vehicle electrical system and the sixth switch, which is of the second battery terminal of the second partial electrical system.

7. A battery terminal which implements an electronically controlled vehicle electrical system coupling-disconnecting functionality including an electronically controlled power distribution, the battery terminal comprising:
a first switch;
a second switch;
a third switch; and
a fourth switch, wherein:
the first switch, the second switch, and the third switch are connected in parallel to one another in a star-point configuration that is configured to be connected to a positive pole of a voltage source; and
the third switch and the fourth switch are connected to each other in series.

8. The battery terminal as recited in claim 7, wherein the first switch is a first MOSFET, the second switch is a second MOSFET, the third switch is a third MOSFET, and the fourth switch is a fourth MOSFET.

9. The battery terminal as recited in claim 8, wherein the third MOSFET and the fourth MOSFET are situated in opposite direction to one another.

10. The battery terminal as recited in claim 8, wherein the third MOSFET and the fourth MOSFET are situated in the same direction to one another.

\* \* \* \* \*